United States Patent [19]
Naimpally

[11] Patent Number: 5,589,993
[45] Date of Patent: *Dec. 31, 1996

[54] DIGITAL HIGH DEFINITION TELEVISION VIDEO RECORDER WITH TRICK-PLAY FEATURES

[75] Inventor: Saiprasad V. Naimpally, Langhorne, Pa.

[73] Assignee: Matsushita Electric Corporation of America, Secaucus, N.J.

[ * ] Notice: The term of this patent shall not extend beyond the expiration date of Pat. No. 5,477,397.

[21] Appl. No.: 339,647

[22] Filed: Nov. 14, 1994

Related U.S. Application Data

[63] Continuation of Ser. No. 21,248, Feb. 23, 1993, abandoned.

[51] Int. Cl.$^6$ ........................... H04N 5/78
[52] U.S. Cl. ................ 386/81; 360/18; 360/24; 348/390; 386/109; 386/123
[58] Field of Search ............... 360/33.1, 10.3, 360/24, 31, 18, 20; 358/12, 140, 141, 335, 310, 133, 136; 348/390, 399, 403

[56] References Cited

U.S. PATENT DOCUMENTS

| | | | |
|---|---|---|---|
| 4,730,222 | 3/1988 | Schauffele | 360/33.1 X |
| 4,825,301 | 4/1989 | Pape et al. | 360/33.1 X |
| 4,931,855 | 6/1990 | Salvadorini | 358/12 |
| 4,941,055 | 7/1990 | Fujimoto | 360/33.1 X |
| 5,055,927 | 10/1991 | Keesen et al. | 358/141 |
| 5,122,875 | 6/1992 | Raychaudhuri et al. | 358/133 |
| 5,136,380 | 8/1992 | Cho | 358/12 X |
| 5,136,391 | 8/1992 | Minami | 360/10.3 X |
| 5,191,431 | 3/1993 | Hasegawa et al. | 360/27 X |
| 5,220,435 | 6/1993 | Yamaguchi et al. | 360/32 X |
| 5,229,862 | 7/1993 | Takahashi et al. | 360/33.1 X |
| 5,260,783 | 11/1993 | Dixit | 358/136 |
| 5,262,877 | 11/1993 | Otsuka | 358/335 X |
| 5,450,209 | 9/1995 | Niimura et al. | 358/335 |

FOREIGN PATENT DOCUMENTS

| | | |
|---|---|---|
| 0353758 | 2/1990 | European Pat. Off. . |
| 0505985 | 9/1992 | European Pat. Off. . |
| 0606857 | 7/1994 | European Pat. Off. . |
| 0177292 | 7/1989 | Japan ................ 360/33.1 |

OTHER PUBLICATIONS

"MPEG Video Simulation Model Three (SM3)," Source: *ISO Simulation Model Editorial Group*, ISO–IEC/JTC1/SC2/WG11 (Jul., 1990).

M. Yoneda et al., "An Experimental Digital VCR With New DCT–Based Bit–Rate Reduction System", *IEEE Transactions on Consumer Electronics*, vol. 37, No. 3, pp. 275–282 (Aug., 1991).

T. Noguchi et al., "A Home–Use Digital VCR With High Density Modulation Method," *IEEE Transactions on Consumer Electronics*, vol. 38, No. 3, pp. 230–235 (Aug., 1992).

J. Lee et al., "A Study on New DCT–Based Bit Rate Reduction Algorithm and Variable Speed Playback For A Home–Use Digital VCR," *IEEE Transactions on Consumer Electronics*, vol. 38, No. 3, pp. 236–242 (Aug., 1992).

(List continued on next page.)

*Primary Examiner*—Andrew L. Sniezek
*Attorney, Agent, or Firm*—Ratner & Prestia

[57] ABSTRACT

A signal processing system for a high resolution digital video tape recorder (VTR) includes circuitry which processes the high resolution video signal to produce a relatively low resolution video signal which may be recorded on the tape with the high resolution video signal. The low resolution video signal is encoded using intra-frame techniques and recorded in fixed-length segments which appear at predetermined locations in the tape tracks. Low resolution segments representing images in different frames may be recovered and combined to produce an image which is suitable for display in trick-play modes. During normal play modes, the data stream representing the high resolution image is recovered in sequence. Accordingly, this high resolution image may be encoded using predictive coding techniques as well as intra-frame techniques.

8 Claims, 7 Drawing Sheets

OTHER PUBLICATIONS

S. Inoue et al., "New Method For Variable Speed Playback For High Definition VCRs", *IEEE Transactions on Consumer Electronics*, vol. 37, No. 3, pp. 244–251 (Aug., 1991).

C. Yamamitsu et al., "An Experimental Study For A Home–Use Digital VTR," *IEEE Transactions on Consumer Electronics*, vol. 35, No. 3, pp. 450–457 (Aug., 1989).

C. Yamamitsu, et al., "A Study on Trick Plays For Digital VCR," *IEEE Transactions on Consumer Electronics*, vol. 37, No. 3, pp. 261–266 (Aug., 1991).

DIGITAL HIGH DEFINITION TELEVISION VIDEO RECORDER WITH TRICK-PLAY FEATURES

This application is a continuation of application Ser. No. 08/021,248 filed Feb. 23, 1993, abandoned.

BACKGROUND OF THE INVENTION

The present invention relates to a video tape recorder for recording high definition television (HDTV) signals and in particular to a recorder which records motion compensated compressed high definition television signals and yet allows trick-play features such as viewing during fast-forward and reverse.

Digital high definition television production schemes have been under development for several years. These schemes typically produce higher quality television images and sound than conventional television systems. To do this, these systems convey more information than is conveyed in a conventional television signal.

Recent regulations issued by the Federal Communications Commission (FCC), however, require that this larger amount of information be sent within the same band of frequencies as a conventional television signal. To fit the relatively large band width High Definition Television (HDTV) signal into a standard television channels the information content of the HDTV signal must be compressed.

Because of the relatively large degree of spatial redundancy and temporal redundancy in the HDTV signals, relatively high levels of data compression can be achieved in most television signals.

One method by which spatial redundancy is removed from a television signal is to generate a discrete cosine transform representation of the image. This representation resolves an image frame into coefficient values representing its various spatial frequency components. Portions of an image which are the same from pixel to pixel or which exhibit a repetitive pattern are resolved from many pixel values to a relatively small number of frequency coefficient values. In addition, since the human eye is less sensitive to quantization errors in image components having high spatial frequencies than in image components having relatively low spatial frequencies, the high spatial frequency coefficients may be coarsely quantized to further reduce the amount of data used to represent the image.

Temporal redundancy in an image is removed by encoding only the areas of a given frame which are different from corresponding areas of a previously encoded frame. This is generally known as predictive coding. Temporal redundancy can be further exploited to achieve even higher levels of data compression by performing motion compensation. Using this scheme, before a image block is encoded, the blocks surrounding it in a previously encoded frame are searched for one block which most closely matches the block in the current frame. The current block is then subtracted from the matching block in the previous frame. The spatial frequency coefficient values are generated based upon the differences between the two image blocks. An exemplary video image compression system which employs motion-compensated predictive encoding techniques is that proposed by the Motion Picture Experts Group (MPEG) and described in the document entitled "Coded Representation of Picture and Audio Information" ISO-IEC/JTC1/SC2/WG11 N0010 MPEG 90/41 dated Jul. 25, 1990.

Other encoding techniques are also used in the MPEG system such as run-length coding, in which strings of identical values are encoded as a smaller number of values; and variable length coding, in which frequently occurring data values are assigned a digital code value having a fewer number of bits than less frequently occurring data values.

Whatever encoding technique is used the HDTV signal must be decoded before it can be displayed. For predictively encoded or motion compensated predictively encoded HDTV signals, the decoding apparatus may include one or more frame memories which hold images that have already been decoded. The pixel values held by these memories are used to reconstruct the predictively encoded data in the current frame.

Using MPEG encoding techniques, HDTV signals having a data rate of between 600 and 1200 Megabits per second (Mbps) can be compressed to produce a signal having a data rate of less than 20 Mbps. As with other terrestrial broadcast signals, consumers will want to be able to receive, display and record signals representing high resolution video images with little no loss of resolution.

On first analysis, the compression of HDTV signals should be beneficial for recording the signals on home use Video Tape Recorders (VTR's), since these units typically have only a limited bandwidth available for recording video signals. For example, a paper by C. Yamamitsu et al. entitled "A Study on Trick-plays For Digital VCR", *IEEE Transactions on Consumer Electronics*, Volume 37, No. 3, August, 1991, PP. 261–266, discloses a home use VCR having a recording rate of 27 Megabits per second (Mbps). A typical HDTV signal, prior to encoding, has a bit-rate of 600 Mbps. Compression methods such as MPEG can reduce these HDTV signals to have a bit-rate of approximately 18 Mbps without noticeably degrading the image quality when the compressed signal is expanded.

The problem with predictively encoded HDTV signals does not occur in recording or in normal playback modes but in trick-play modes such as fast-forward and reverse in which the video image is displayed at a higher rate than that at which it was recorded.

The problem is illustrated in FIGS. 1 and 2. FIG. 1 shows the track scanning sequence of pre-recorded video information during normal playback. As shown in FIG. 1, slices of the video image 110, 112, 114 and 116 are scanned in sequence as the tape head moves along the track 0. Each of these slices represents the same number of pixels in the reproduced image. As shown in the figured however, the amount of data in a slice may vary from slice-to-slice. This variation in the amount of data in a slice occurs because of the relative coding efficiencies of the slices in the original HDTV signal. Slices which represent still portions of a multi-frame image or which represent portions having relatively little variation may be encoded using a relatively small number of data values. Image portions containing a high level of detail and having no corresponding portions in previously encoded frames may require a significantly larger number of data values when they are encoded.

When the image signals are read from the tape during normal playback each slice of each frame is read from the tape in sequence. If the coding method which produced the HDTV signals used predictive coding techniques the recorded data includes both intra-frame coded data and predictively coded data. In normal playback as the data is removed from the tape the pixel values for the intra-frames are stored in a memory and are available for use in reconstructing the predicted frames.

FIG. 2 illustrates the track scanning sequence during a fast-forward trick-play mode. In this mode, instead of sequentially taking the slices 110, 112, 114 and 116 the slices recovered are in sequence 110, 118, 120, 122 and 124. As shown in this figure, some slices, for example, slices 112, 114, 116, 119 and 121, are never recovered from the tape. If some of these slices (e.g. 112 and 114) are from an intra-coded frame, then their corresponding data values will not be available when corresponding slices (e.g. 122 and 124) of a predicted frame, which is based on the intra-coded frame, are read from the tape. Consequently it may not be possible to properly reconstruct the predicted frame for display.

Because of the difficulties of recovering predicted frames in trick-play modes most of the proposed methods for recording digitally compressed (bit-rate reduced) signals have restricted the encoding techniques that are used to encode data for recording on VTR's to exclude predicted frames. Exemplary systems of this type are described in an article by C. Yamamitsu, et al. entitled "An Experimental Study for a Home-Use Digital VTR", *IEEE Transactions on Consumer Electronics*, Volume 35, No. 3, August 1989, PP. 450–457, and in a paper by J. Lee et al., entitled "A Study on New DCT-Based Bit Rate Reduction Algorithm and Variable Speed Playback for a Home-Use Digital VCR", *IEEE Transactions on Consumer Electronics*, Volume 38, No. 3, August 1992, PP. 236–242. As described above, since these systems do not use predicted frames, they cannot compress data with the efficiency of a system which does use predicted frames. Consequently, for the same compression ratios, they cannot achieve the same levels of detail in the reproduced image as a system, such as MPEG, which uses motion-compensated predictive coding techniques.

SUMMARY OF THE INVENTION

The present invention is embodied in a digital VCR which records HDTV signals having both intra-coded and predicted frames in a manner which allows for trick-play display of the recorded video signals. The apparatus includes a source of HDTV signals and circuitry coupled to the source for generating a signal representing a low resolution image. The source of HDTV signals is also coupled to circuitry which generates expanded (i.e. uncompressed) data representing HDTV signals. In addition, the apparatus includes circuitry which divides both the low resolution data stream and the compressed HDTV data stream into respective segments. The segments representing the low resolution image are interleaved with the segments representing the HDTV signals and combined data stream is recorded on the tape.

DETAILED DESCRIPTION

Overview

According to the subject invention two separate data streams representing the HDTV video signal are generated, one of these data streams is a compressed HDTV signal which, when recovered and displayed, produces a full resolution HDTV image. The second data stream represents a low resolution image which is sufficient for display in trick-play modes and which may be efficiently compressed to a relatively small number of data values using only intra-frame encoding techniques.

Each of these data streams is separated into relatively small data segments. The segments of at least one of the data streams are identified by a header and recorded on the tape. In the exemplary embodiment of the invention, the low resolution segments are fixed in length, are identified by headers and are interleaved among the segments which contain data for the high resolution image. The header information for the low resolution segments indicates the pixel location of the image data conveyed by the segment in the image frame.

Alternatively, both the low resolution segments and the high resolution segments may be variable in length, with the low resolution segments having a fixed maximum length. In this instance, the headers of the low resolution segments desirably contain a field which specifies the length of the segment.

As the low resolution data segments are recovered in trick-play mode, the recovered data values are stored in a frame memory which is used to generate the display during trick-play mode. By employing conventional error concealment techniques the recovered low-definition image data may be used to produce an image which is sufficient for trick-play modes, such as are displayed during fast forward and reverse, while allowing a full resolution HDTV signal (i.e. the high resolution segments) to be recovered and displayed during normal play modes.

During normal play the combined data stream is recovered and demultiplexed to regenerate the original HDTV data stream which is then expanded by a conventional decoder. The recovered expanded HDTV signal is then displayed as a high-resolution HDTV image.

DETAILED DESCRIPTION OF THE EXEMPLARY EMBODIMENTS

Figure 1:
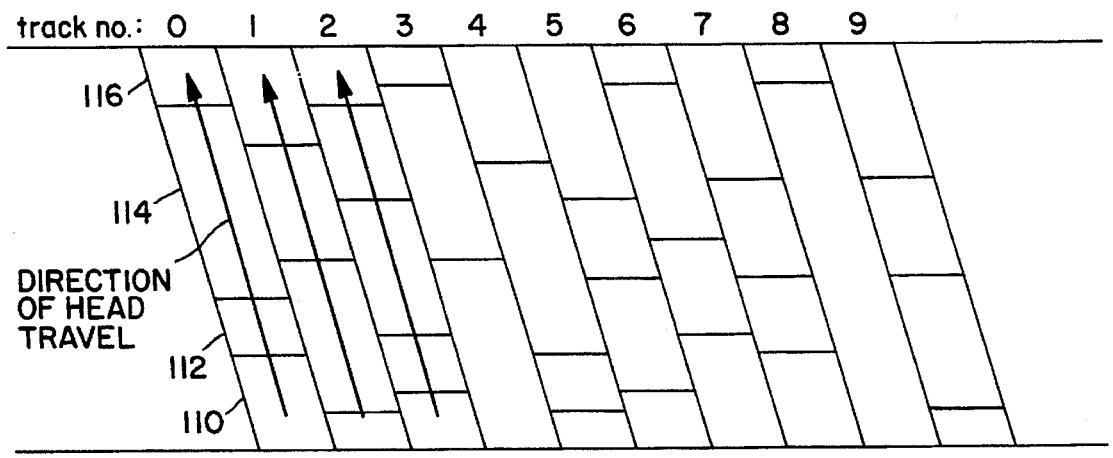
FIG. 1 (prior art) is a graphical representation of a segment of video tape which illustrates the scan path of the video heads in normal mode.
Figure 2:
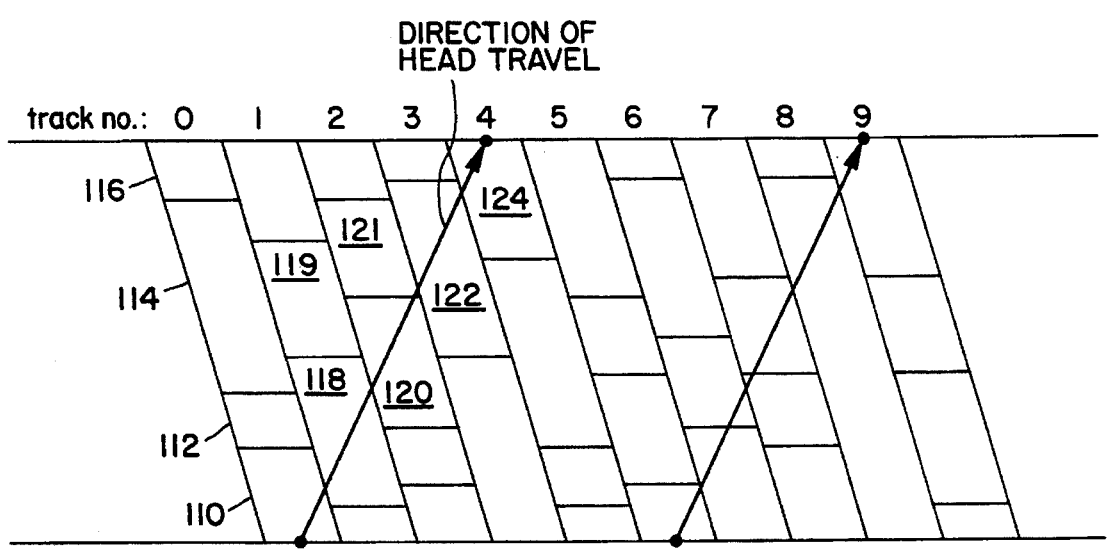
FIG. 2 (prior art) is a graphical representation of a segment of tape which illustrates the scan path of the video heads in trick-play mode.
Figure 3:
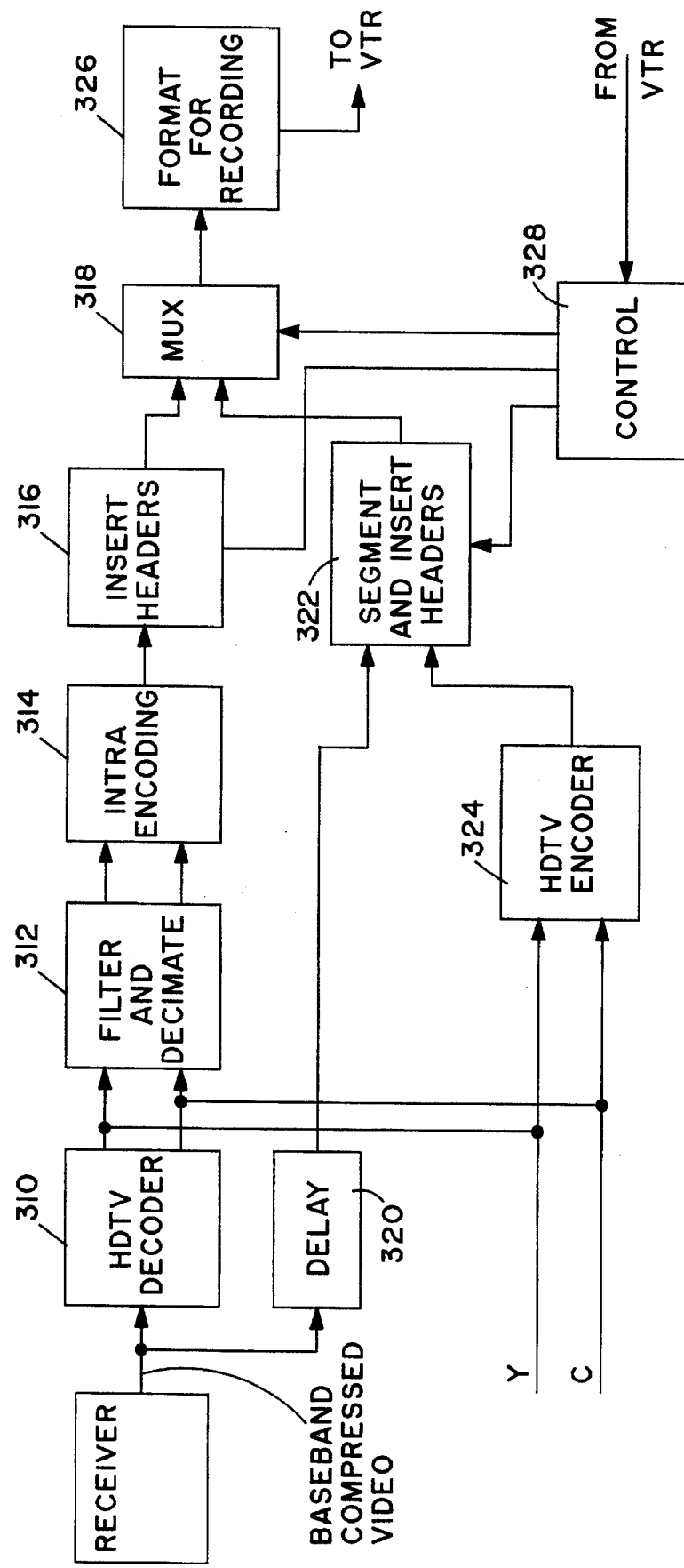
FIG. 3 is a block diagram of a video encoding system which includes an embodiment of the present invention.

In the exemplary embodiment of the invention shown in FIG. 3, a broadcast HDTV signal is demodulated by receiver 308, to obtain a baseband compressed video signal. This signal is applied in parallel to an HDTV decoder 310 and a delay element 320. The decoder 310 expands the compressed signal to recover the full high resolution HDTV video signal. Recovered luminance and chrominance components produced by the decoder 310 are applied to circuitry 312 which low-pass filters and decimates the signal to produce samples representing the same image but at much lower resolution.

The luminance and chrominance samples produced by the filter and decimate circuitry 312 are applied to an encoder 314 which compresses the samples representing the low resolution video image using only intra-frame coding techniques. In this exemplary embodiment of the invention these techniques include discrete cosine transformation, adaptive quantization, run-length coding and variable length coding.

The encoded low resolution signal provided by the circuitry 314 is applied to a circuit 316 which segments the data into relatively small blocks, which may be fixed-length, and inserts header information at the start of each block. The data are segmented such that the pixel values represented by each block may be reproduced without reference to any other block. If a segment is larger than needed to hold a compressed block, the remaining space in the segment is padded with dummy data values. Alternatively, the compressed low-resolution segments may be variable in length, up to a fixed maximum length. In this instance, the length of the low-resolution segment may be stored in the segment header.

As described above, the baseband compressed video data is also applied to a delay element 320. This element compensates for processing delays through the HDTV decoder 310, filter and decimate circuitry 312 and the intra-coding circuitry 314. The delayed samples provided by the delay element 320 are applied to circuitry 322 which divides the data into segments and, optionally, inserts header information at the start of each segment.

In the exemplary embodiment of the invention, each segment of low resolution data desirably represents a portion of an image which may be decoded without reference to any other segment. That is to say, each segment of the low resolution data represents an independent slice of the low resolution image.

The segments of the high resolution image are not so limited. Since data in these segments is recombined before the high resolution image is displayed, as described below with reference to FIG. 4, a slice of the high resolution image may be split across multiple high resolution data segments.

The segments produced by the circuitry 322 are applied to one signal input port of a multiplexer 318, the other signal input port of which is coupled to receive the segments of the reduced resolution signal provided by the circuitry 316. The circuits 316, 318 and 322 are all under control of circuitry 328 which, responsive to signals provided by a VTR (not shown) alternately applies segments provided by the circuitry 316 and circuitry 322 to a circuit 326 which formats the data values for recording. The circuit 326 may include for example an error correction code (ECC) encoder, a channel encoder and a recording amplifier.

The control signals received by the circuitry 328 from the VTR allow the encoder shown in FIG. 3 to position the segments of the high resolution video information and the reduced resolution video information at predetermined locations in each track on the tape. This positioning is described below with reference to FIGS. 5 and 6.

In addition to recording baseband video signals the circuitry shown in FIG. 3 allows high definition luminance (Y) signals and chrominance (C) signals to be encoded and recorded. The Y and C signals produced, for example, by a high definition video camera are applied in parallel to HDTV encoder circuitry 324 and to the low-pass filter and decimate circuitry 312. The circuitry 312 operates in the manner described above to produce segmented data representing a low resolution image at the output port of the insert header circuitry 316. The HDTV encoder 324, on the other hand, processes the signals Y and C to produce compressed data representing an HDTV image. The encoder 324 may use only intra-frame encoding techniques such as discrete cosine transformation and variable length coding or, optionally, may be a conventional MPEG encoder which uses motion compensated predictive encoding techniques. The output signal provided by the HDTV encoder 324 is applied to the circuitry 322, described above, in place of the delayed compressed baseband video signal.

Figure 3A:
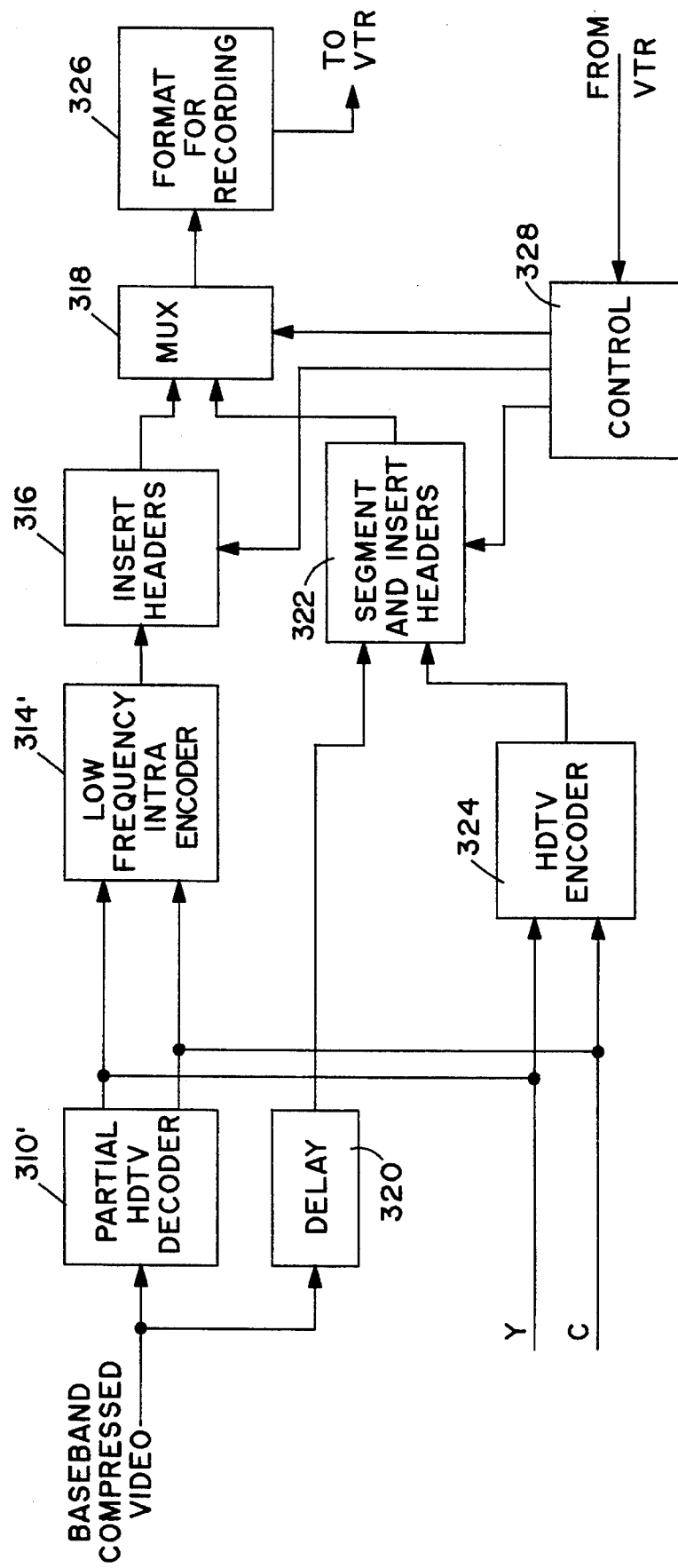
FIG. 3a is a block diagram of an alternative video encoding system which includes an embodiment of the present invention.

FIG. 3a is an alternative embodiment of the processing system shown in FIG. 3. In this alternative system, the filter and decimate circuitry 312 has been removed. The operations performed by this circuitry are incorporated in a modified partial HDTV decoder 310' and a modified low frequency intra-frame encoder 314'.

To understand the operation of the modified decoder 310' and modified encoder 314', it is helpful to understand discrete cosine transforms. Basically, a discrete cosine transform operation processes a block of, for example, 64 pixels arranged in an 8×8 matrix to produce 64 coefficient values which represent the relative spatial frequency components of the pixels in the block. An exemplary block of coefficients produced by a discrete cosine transform operation is shown in Table 1.

TABLE 1

|   | 0 | 1 | 2 | 3 | 4 | 5 | 6 | 7 |
|---|---|---|---|---|---|---|---|---|
| 0 | $C_{00}$ | $C_{01}$ | $C_{05}$ | $C_{06}$ | $C_{14}$ | $C_{15}$ | $C_{27}$ | $C_{28}$ |
| 1 | $C_{02}$ | $C_{04}$ | $C_{07}$ | $C_{13}$ | $C_{16}$ | $C_{26}$ | $C_{29}$ | $C_{42}$ |
| 2 | $C_{03}$ | $C_{08}$ | $C_{12}$ | $C_{17}$ | $C_{25}$ | $C_{30}$ | $C_{41}$ | $C_{43}$ |
| 3 | $C_{09}$ | $C_{11}$ | $C_{18}$ | $C_{24}$ | $C_{31}$ | $C_{40}$ | $C_{44}$ | $C_{53}$ |
| 4 | $C_{10}$ | $C_{19}$ | $C_{23}$ | $C_{32}$ | $C_{39}$ | $C_{45}$ | $C_{52}$ | $C_{54}$ |
| 5 | $C_{20}$ | $C_{22}$ | $C_{33}$ | $C_{38}$ | $C_{46}$ | $C_{51}$ | $C_{55}$ | $C_{60}$ |
| 6 | $C_{21}$ | $C_{34}$ | $C_{37}$ | $C_{47}$ | $C_{50}$ | $C_{56}$ | $C_{59}$ | $C_{61}$ |
| 7 | $C_{35}$ | $C_{36}$ | $C_{48}$ | $C_{49}$ | $C_{57}$ | $C_{58}$ | $C_{62}$ | $C_{63}$ |

In this exemplary coefficient block, coefficient $C_{00}$ represents the magnitude of the direct current (DC) component of the pixel values in the block. Coefficients $C_{01}$ through $C_{63}$ represent successively higher spatial frequency components of the image formed by the block of pixels. The partial HDTV decoder 310' masks the block of DCT coefficients as illustrated in Table 2 so that there are only 16 non-zero coefficients in any block, namely the coefficients in the upper left quadrant.

TABLE 2

|   | 0 | 1 | 2 | 3 | 4 | 5 | 6 | 7 |
|---|---|---|---|---|---|---|---|---|
| 0 | 1 | 1 | 1 | 1 | 0 | 0 | 0 | 0 |
| 1 | 1 | 1 | 1 | 1 | 0 | 0 | 0 | 0 |
| 2 | 1 | 1 | 1 | 1 | 0 | 0 | 0 | 0 |
| 3 | 1 | 1 | 1 | 1 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

Since coefficients representing relatively high spatial frequency components are set to zero the result obtained by decoding this block of DCT coefficients (i.e. the inverse DCT transform of the masked block of coefficients) is a low pass filtered signal. By decimating the pixels in the block by 2 to 1 both horizontally and vertically, the image may be decimated by a factor of four.

If the compressed baseband video signals include motion compensated predicted frames, it may be desirable to adjust the motion vectors accompanying blocks or macro blocks of the compressed pixels so that the motion vectors will continue to point to corresponding blocks or macro blocks from the appropriate previously decoded frames. In the exemplary embodiment of the invention, since the partial decoder 310' produces an expanded image which is decimated by 4 to 1 with respect to the high resolution image, each component of the motion vector is desirably divided by two. Importantly, the reference frame memory which holds the reconstructed image for further decoding, need only be one-fourth the size of a full HDTV frame memory.

The low frequency intra-frame encoder 314' compresses the low resolution signal by reblocking the pixels in the decimated image into 8×8 blocks, converting these blocks into DCT coefficients, applying adaptive quantization and variable length coding with the constraint that a certain fixed number of 8×8 blocks of pixels are coded by a fixed maximum number of bits (i.e. the maximum length of a low-resolution block).

The remainder of the circuitry shown in FIG. 3a operates identically to that shown in FIG. 3 and, so, is not described in detail.

Figure 4:
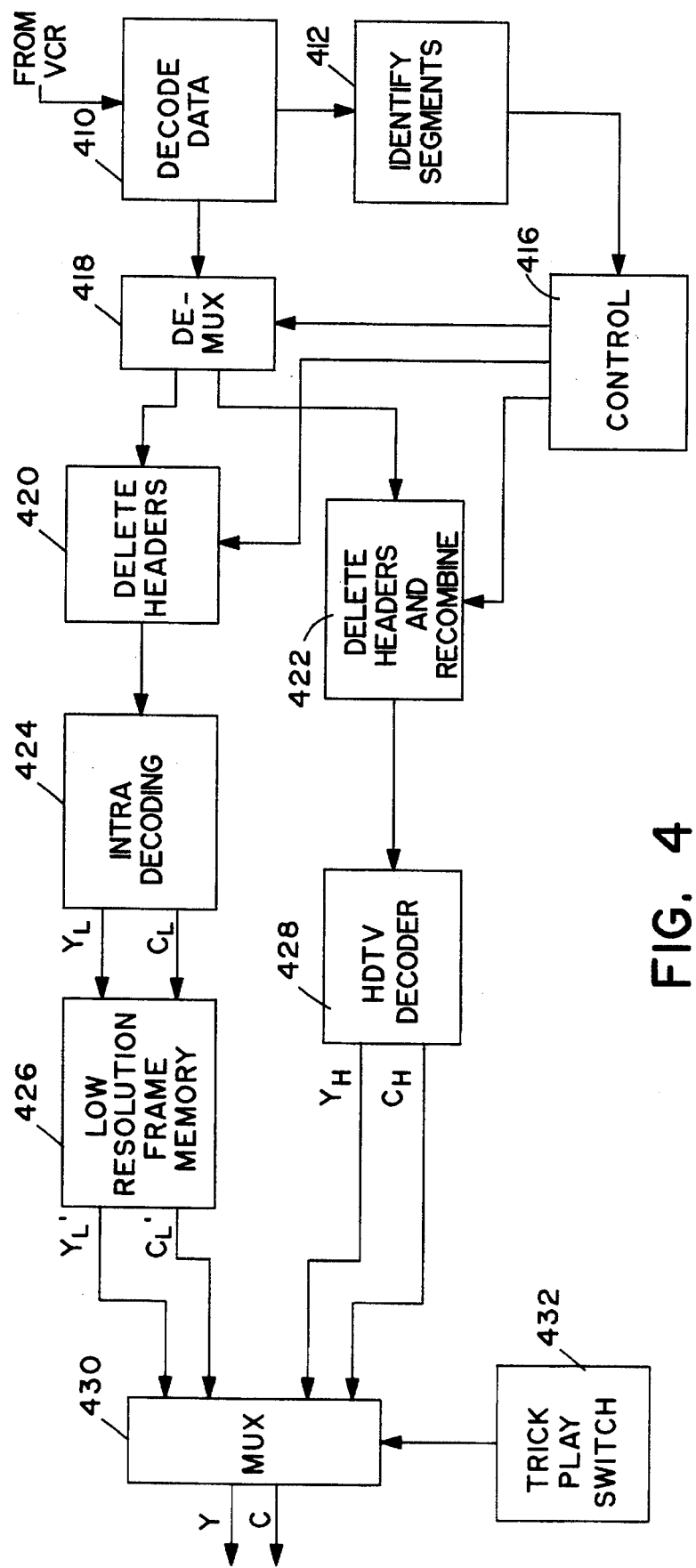
FIG. 4 is a block diagram of circuitry suitable for use in recovering data for display from the tape which data was encoded using the processing system shown in FIG. 3.

FIG. 4 is a block diagram of circuitry in the VTR which recovers the data from the tape and provides either the high resolution HDTV signal or the low resolution signal for display, based on the position of a trick-play switch 432.

In the processing circuitry shown in FIG. 4, data from the tape is provided to circuitry 410 which decodes the data to reproduce digital values. The decoder circuitry 410 may include, for example, a head amplifier, a detector and a ECC decoder. Digital values provided by the circuitry 410 are applied to a demultiplexer 418. In addition circuitry 410 provides signals to a circuit 412 which recognizes header information in the recorded data stream and identifies segments of the low resolution and high resolution image signals.

The segment identification information produced by the circuitry 412 is applied to control circuitry 416. Circuitry 416 produces an output signal which is applied to the control input terminal of demultiplexer 418. Responsive to this signal, demultiplexer 418 applies blocks of data representing the low resolution signal to the circuitry 420 and blocks of data representing the high resolution image to circuitry 422. Under control of the circuitry 416 the circuit 420 deletes the header information from the low resolution encoded video data and applies the result to intra-frame decoding circuitry 424. The circuitry 424 reverses the intra-frame encoding which was performed by circuitry 314, described above with reference to FIG. 3, to produce low resolution luminance ($Y_L$) and chrominance ($C_L$) signals. These signals are applied to a low resolution frame memory 426.

The control circuitry 416 also controls circuit 422 causing it to delete any header information which may have been appended to the segments of high definition encoded video signal. As described above, in the exemplary embodiment of the invention, there is no header information on the high resolution blocks, only on the low resolution blocks.

The circuitry 422 also recombines the segments of the high-resolution image into a data stream which is substantially identical to the received baseband compressed video signal shown in FIG. 3. The signal produced by the circuitry 422 is applied to an HDTV decoder 428 which processes it to produce full resolution luminance ($Y_H$) and chrominance ($C_H$) component HDTV signals.

The signals $Y_L'$ and $C_L'$, which are retrieved from the frame memory 426, are applied to one pair of input ports of a multiplexer 430 while the signals $Y_H$ and $C_H$ produced by the HDTV decoder 428 are applied to a second pair of signal input ports of the multiplexer 430. The multiplexer 430 is controlled by the trick-play switch 432 to provide the low resolution signals in trick-play display mode and to provide the high resolution signals in normal play mode.

To be compatible with the circuitry shown in FIG. 3a, it is contemplated that the intra-decoding circuitry 424 shown in FIG. 4 may use a modified DCT coefficient mask such as that shown in Table 2 and that the low resolution frame memory 426 may have a number of cells which is approximately ¼ of the number of cells which would be normally used to hold a full resolution HDTV video image. In this alternative embodiment, it may be desirable to repeat each pixel value and each line of pixel values which are read from the frame memory 426 three times in order to generate a low resolution display which is the same size as the high resolution display.

Figure 5:
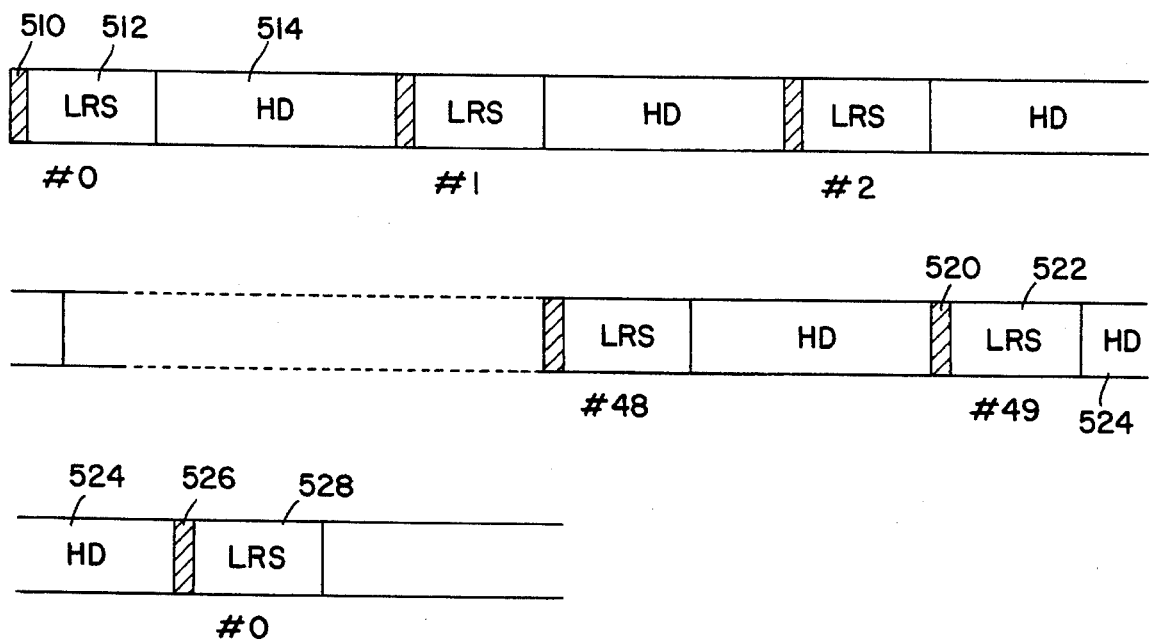
FIG. 5 is a timing diagram which illustrates the structure of the interleaved data stream generated by the circuitry shown in FIG. 3.
Figure 6:
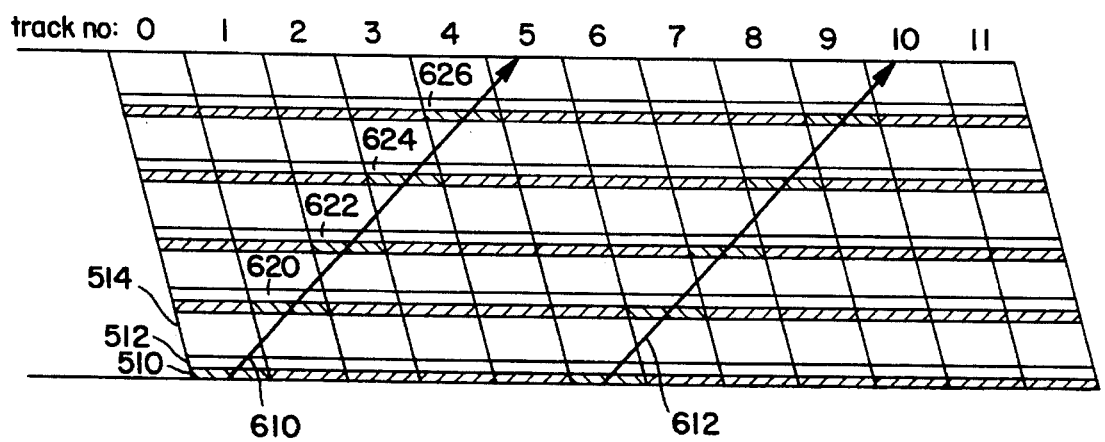
FIG. 6 is a graphical depiction of a segment of tape, which was made using the circuitry shown in FIG. 3, and which illustrates the scan path of the video heads in trick-play mode.

FIG. 5 is a timing diagram which illustrates the structure of the signal provided by the multiplexer 318 of FIGS. 3 and 3a, and of the signal provided to the demultiplexer 418 of FIG. 4. As shown in this timing diagram, in this exemplary embodiment of the invention, a complete HDTV video image is represented by 50 compound segments, each compound segment includes a header 510, a low resolution image segment 512 and a high resolution image segment 514. In the exemplary embodiment of the invention, each of the low resolution segments is fixed length and recorded at a predetermined location on the video tape. This is illustrated in FIG. 6, which shows the track, 610 and 612, followed by the VTR heads in trick-play mode at five times normal speed. It is contemplated that the low resolution segments may be recorded at locations on the tape track that are not precisely fixed. This would be done, for example, if variable length low resolution data segments were used. The segments would be recorded, however, at intervals along the tape sufficient to ensure that, in trick play modes, a fraction of the segments (e.g. ½, ⅓, ¼, etc.) would be recovered that is in inverse proportion no the tape speed (e.g. 2×, 3×, 4×, etc.). Even though the low-resolution blocks may be variable length, it is desirable to limit their length to some defined maximum length. This length may be, for example, the maximum amount of data which can be recovered by a tape-head as it scans across a track at its highest speed.

As shown in this Figure, the tape head which follows track 610 collects the low resolution segments 510, 620, 622, 624 and 626. Since the image data in these segments is low resolution intra-frame coded data representing a slice of the low resolution image; the picture elements represented by this data may be recovered and displayed without reference to any other segments.

The size of the low resolution segments relative to the high resolution segments and the placement of both types of segments on the tape are important considerations. In general these factors would vary with different HDTV formats. As an example, an MPEG HDTV format is selected in which encoded data representing a high resolution image is provided at a data rate of 18 Mbps. Since frames are updated 30 times per second the average frame length for the high resolution image, $FL_H$, is given by equation (1):

$$FL_H = \frac{18 \times 10^6}{30} = 600000 \qquad (1)$$

Individual frames may require less or more data for encoding. The buffer controller (not shown) of the video encoder (not shown) which generates the encoded high resolution image signals insures that the average data rate is 600,000 bits per frame.

As described in the above referenced papers, MPEG compression techniques produce compressed video signals having data rates of approximately 18 Mbps and video recording rates on the order of 25 Mbps are currently planned for consumer digital video tape recorders. Accordingly, approximately 7 Mbps (25 Mbps 18 Mbps) is available to hold the low resolution video signal. This translates to a frame length, $FL_L$, of 233,333 bits per frame of the low resolution signal as shown in Equation 2.

$$FL_L = \frac{7 \times 10^6}{30} = 233333 \qquad (2)$$

If the 600,000 HDTV bits are spread out over 10 tracks then the 233,333 low resolution image bits should be spread out over the same 10 tracks. This insures that, during trick-play modes when the VCR plays back only the low resolution signals the image produced is roughly in the same time frame as the high definition image that would be produced. If, as shown in FIG. 6, the low resolution image were divided such that there were 5 image blocks per track over the 10 tracks, then 50 image blocks would be needed to reproduce a frame of the low resolution signal. Thus each image block would contain roughly 4,666 bits.

Each image block would include header information which would indicate the addresses of the pixels represented by the image block relative to the display screen. The header would also desirably include some type of synchronization code so that the header could be identified from the data stream by the tape. There would be no need for a separate header on the high definition blocks since the block size for the low resolution image blocks is either contained in the header or is fixed at some predetermined value.

As shown in FIG. 6, only a portion of the low resolution signal is recovered during trick-play modes. In FIG. 6, since the tape is being scanned at 5 times normal speed, roughly ⅕ of the low resolution image is recovered. If a similar diagram (not shown) were done for 2 times speed it would show that roughly ½ of the low resolution signal would be recovered. Conventional error concealment techniques may be used to fill in the image blocks which are not recovered from the tape during the trick-play modes.

These missing blocks may be provided, for example, from stored previously recovered frames. Referring to FIG. 4, this would be accomplished by having the intra-decoding circuitry 424 write blocks of pixel data into the low resolution frame memory 426 at the addresses identified in the block headers. The low resolution image would then be scanned from the memory 426 and passed by the multiplexer 430.

Due to different compression efficiencies of different video frames the number of pixels represented by an image block of the low resolution signal is not a constant. In the exemplary embodiment of the invention, this is advantageous since it acts to prevent instances where image blocks are presenting only certain portions of the image are repeatedly updated while image blocks representing other portions of the image are either not updated at all or are updated only infrequently.

To prevent this type of patchwork display during trick-play modes it may also be desirable to randomize the recording of the low resolution data blocks in the frame or to establish some fixed offset in the selection of block positions for the low resolution image blocks such that a block in a particular track position may move around the image when successive images are encoded.

Figure 7:
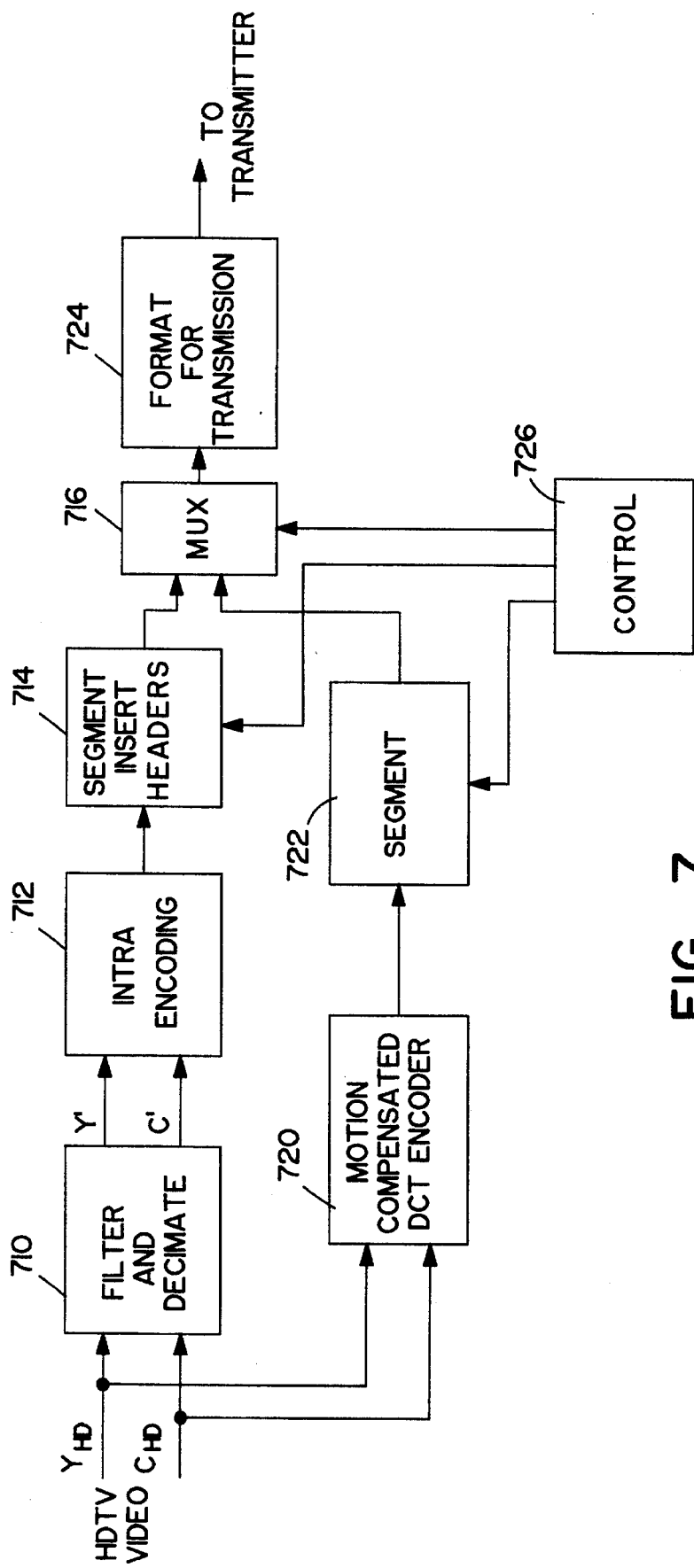
FIG. 7 is a block diagram of an HDTV encoder which generates interleaved high-definition and low-definition coded data streams representing an image.

FIG. 7 is a block diagram of an alternative embodiment of the invention in which the low resolution image is generated at the same time as the high resolution image. The circuitry shown in FIG. 7 may be implemented either at the transmitter as shown in FIG. 7 or directly in a digital VTR. In the circuitry shown in FIG. 7, a high definition luminance signal ($Y_{HD}$) and a high definition chrominance signal ($C_{HD}$) are applied in parallel to a filter and decimate circuit 710 and to a motion compensated discrete cosine transform encoder 720.

The circuit 720 performs a full high definition television encoding operation using, for example, an MPEG encoding method. As described above, this technique takes advantage of redundancy within a frame (intra-frame coding) and of temporal redundancy, that is to say redundancy between frames (predictive coding). It is well known that this type of encoding can reduce a data stream representing a high definition image and having a bit rate of 600 to 1200 Mbps to a signal having a bit rate of 18 Mbps which can be reproduced with little or no noticeable degradation in the image quality.

The samples applied to filter and decimate circuitry 710 are low pass filtered in both vertical and horizontal directions to eliminate substantially all high spatial frequency components. The low resolution luminance (Y') and chrominance (C') signals provided by the circuitry 710 are applied to intra-frame encoding circuitry 712. This circuitry may, for example, apply a combination of discrete cosine transformation, adaptive quantization, variable length coding and run length coding in order to reduce the data stream to approximately 1 Mbps. This bit stream is applied to circuitry 714 which segments the bit stream into the low resolution image blocks and inserts header information to both identify the low resolution block and to separate the low resolution blocks from high resolution blocks.

The high resolution blocks are produced by circuitry 722 which is coupled to receive the output bit stream provided by the motion compensated DCT encoder 720. The circuits 714 and 722 are controlled by circuitry 726 to segment the respective low resolution and high resolution data streams in a ratio of 1 to 18. The two segmented data streams are applied to respective input ports of a multiplexer 716 which is also controlled by the circuitry 726.

The multiplexer 716 produces a time division multiplex output signal similar to that shown in FIG. 5 except that the composite bit rate of the low resolution data signals is 1 Mbps instead of 7 Mbps as in FIG. 5. This multiplexed output signal is applied to circuitry 724 which formats it for transmission. This circuitry may include for example a 16 quadrature amplitude modulator (QAM) circuit.

It is contemplated that, in the circuitry shown in FIG. 7, the filter and decimate block 710 may be eliminated and the intra-coding circuity 712 modified to perform both the filter and decimate operations. An exemplary modification may be to mask all but the one-quarter of the coefficients representing the lowest spatial frequency coefficients of the image, as generated by the discrete cosine transformation operation.

Figure 8:
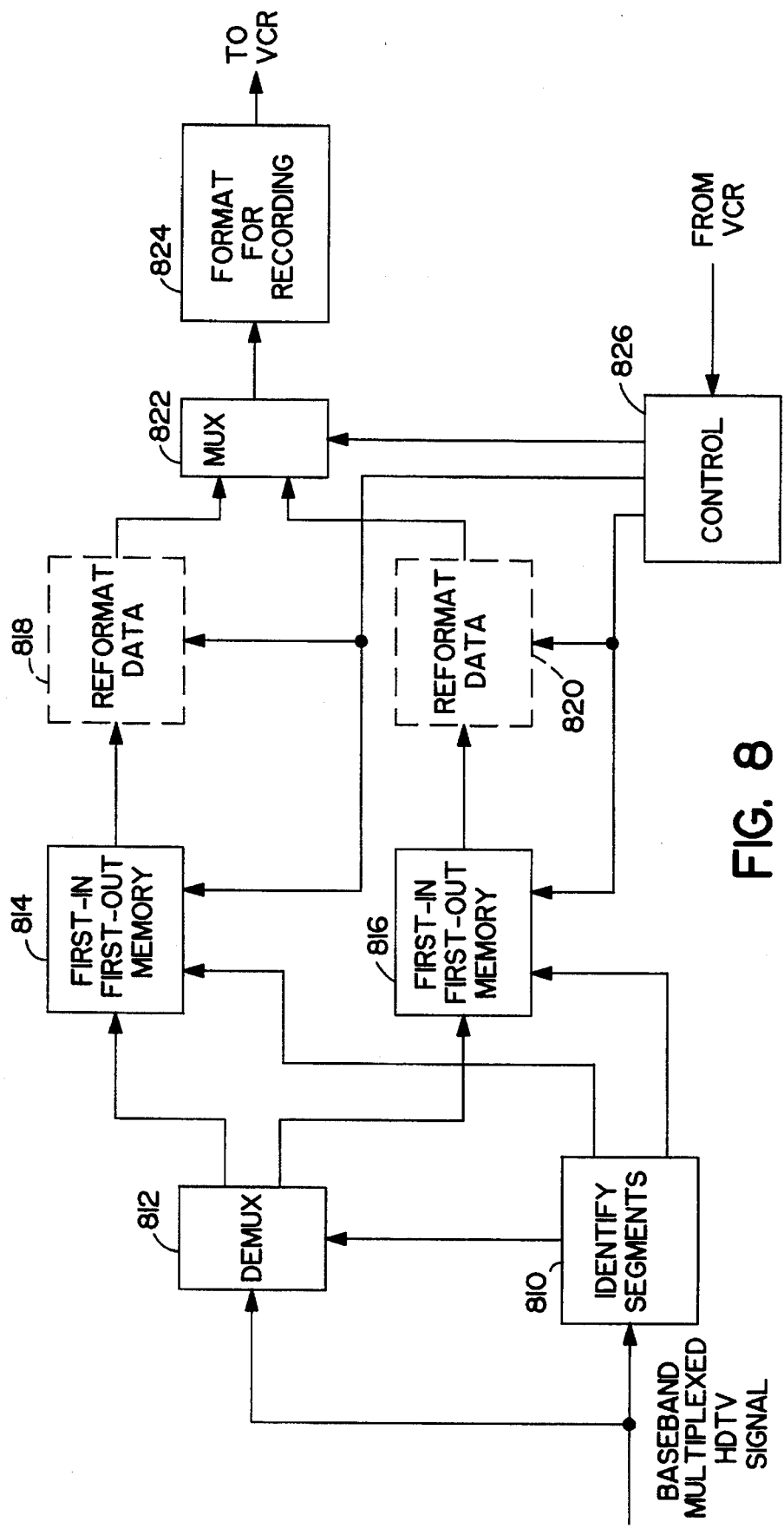
FIG. 8 is a block diagram of circuitry suitable for recording the interleaved data stream produced by the circuitry shown in FIG. 7.

FIG. 8 is a block diagram which illustrates how the signal generated by the circuitry shown in FIG. 7 would be handled at a consumer VTR. In FIG. 8 the baseband multiplexed signal, containing both low resolution and high resolution segments, is applied to a circuit 810 which identifies the segments in the data stream. As described above this circuit may operate by searching the data stream for a particular pattern which corresponds to the beginning of the header information of a low resolution image block. Responsive to this identification, the circuit 810 conditions the demultiplexer 812 to pass the data representing only the low resolution image block to a first in-first out memory 814. After the low resolution image block has been written into the memory 814, the circuitry 810 conditions the demultiplexer 812 to pass the high resolution image block to the first in-first out memory 816.

The data values in the memories 814 and 816 are read under control of circuitry 826. The values read from the memories 814 and 816 are applied to optional circuits 818 and 820. These circuits may, for example, reformat the data into different size blocks. Depending on the relative frequency at which the low resolution image signal is inserted into the multiplexed HDTV signal, it may be desirable to split up a single low resolution block into multiple blocks or to combine multiple low resolution blocks into a single block before the block is recorded on the tape. This may be done for example to insure that a proper number of low resolution image blocks are recorded at appropriate positions on the tape.

If, however, the datastream provided by the transmitter has the low resolution and high resolution image blocks in the proper sequence and repetition rate for recording, then the circuits 818 and 820 may be eliminated.

The low resolution and high resolution image blocks, whether provided by the memories 814 and 816 or by the reformat circuits 818 and 820, are applied to respectively different input ports of a multiplexer 822. This multiplexer is also controlled by the circuitry 826 to combine the low resolution and high resolution image blocks into segments that are in proper sequence for recording. To ensure that these segments are placed at proper positions on the tape, the control circuitry 826 receives a synchronization signal from the VTR (not shown). This synchronization signal may, for example, indicate the current position of the tape head on the track.

The output signal produced by the multiplexer 822 is applied to circuitry 824 which formats the data for recording. This circuitry may be identical to the circuitry 326 shown in FIGS. 3 and 3A.

The present invention has been described in terms of a method and apparatus for recording both a low resolution image and a high resolution image on a consumer VTR. This is done to allow the VTR to display the low resolution image during trick-play modes while recording an efficiently compressed high resolution image. It is contemplated, however that the low resolution image may be used for different purposes. For example, a broadcast low resolution image, such as that produced by the circuitry shown in FIG. 7 may be recovered at the receiver and displayed as the inset picture in a picture in a picture (PIX-in-PIX) display. Alternatively, low resolution images may be recovered from each signal in the scan list to produce a multiple picture display which indicates the current programming on each channel. Finally, it is contemplated that the recovered low resolution image data may be used to conceal known errors in the recovered high resolution data.

In addition, while the low resolution image is disclosed as a color image, it is contemplated that further compression efficiency may be achieved by encoding and displaying only the luminance portion of the image.

While the present invention has been described in terms of an exemplary embodiment it is contemplated that it may be practiced as outlined above within the spirit and scope of the appended claims.

The invention claimed is:

1. Apparatus which processes signals representing video image information to produce a signal to be recorded on a tape by a digital video tape recorder (VTR), whereby the image may be displayed from the recorded signal when the VTR is operating in a trick-play mode, said apparatus comprising:

means for providing a first data stream representing a relatively high resolution video image which has been encoded using motion compensated encoding techniques;

data compression means for compressing the first data stream to generate a segmented second data stream representing a relatively low resolution version of said high resolution image, wherein the first data stream is independent of the second data stream for reproducing the image, the second data stream is independent of the first data stream for reproducing the image, and each segment of the second data stream may be expanded independently of any other segment;

means for segmenting the first data stream to produce a first set of data segments representing the high resolution image;

means for interleaving respective data segments representing the first and second data streams to generate the signal to be recorded by the VTR, whereby image data recorded in the low resolution data segments is displayed in trick-play mode.

2. Apparatus according to claim 1 further including means for controlling the timing of the interleaving of the respective data segments in the first and second sets to ensure that the segments in the second set are recorded on the tape at approximately regular intervals.

3. Apparatus according to claim 1, wherein the data compression means includes:

expansion means for generating an expanded high resolution video signal from the encoded high resolution data stream;

filtering means for processing the expanded high resolution video signal to attenuate components thereof having higher spatial frequencies relative to components having lower spatial frequencies to produce a relatively low-resolution output signal; and compression means for digitally compressing the low-resolution output signal to produce the second data stream.

4. Apparatus which processes signals representing video image information to produce a signal to be recorded on a tape by a digital video tape recorder (VTR), whereby the image may be displayed from the recorded signal when the VTR is operating in a trick-play mode, said apparatus comprising:

means for providing a first data stream representing a relatively high resolution video image which has been encoded using motion compensated encoding techniques;

data compression means for compressing the first data stream to generate a segmented second data stream representing a relatively low resolution version of said high resolution image, wherein the first data stream is independent of the second data stream for reproducing the image, the second data stream is independent of the first data stream for reproducing the image, and each segment of the second data stream may be expanded independently of any other segment wherein the data compression means includes:

means for partially decoding the first data stream by decoding relatively low-resolution components of the high resolution video image to the substantial exclusion of high-resolution components thereof; and means for digitally encoding the partially decoded first data stream to generate the second data stream;

means for segmenting the first data stream to produce a first set of data segments representing the high resolution image; and means for interleaving respective data segments representing the first and second data streams to generate the signal to be recorded by the VTR, whereby image data recorded in the low resolution data segments is displayed in trick-play mode.

5. Apparatus which processes signals representing video image information to produce a signal to be recorded on a tape by a digital video tape recorder (VTR), wherein the video signals include spatially redundant portions and temporally redundant portions, whereby the image may be displayed from the recorded signal when the VTR is operating in a trick-play mode, said apparatus comprising:

means for providing a first data stream representing a relatively high resolution video image which has been encoded using motion compensated encoding techniques, wherein the first data stream includes video data which has been digitally encoded to provide a reduction in the portion of the data stream used to represent both spatially redundant components and temporally redundant components of the high resolution video image;

data compression means for compressing the first data stream to generate a segmented second data stream representing a relatively low resolution version of said high resolution image, wherein said first data stream is independent of the second data stream for reproducing the image and each segment of the second data stream may be expanded independently of any other segment; wherein the data compression means includes, means for processing the encoded video signal to generate, as the second data stream, a further digitally encoded signal representing the lower resolution version of the high resolution video image by reducing the spatially redundant portion of the low resolution video signal without significantly reducing the temporally redundant portion of the low resolution video signal;

means for segmenting the first data stream to produce a first set of data segments representing the high resolution image; and means for interleaving respective data segments representing the first and second data streams to generate the signal to be recorded by the VTR, whereby image data recorded in the low resolution data segments is displayed in trick-play mode.

6. Apparatus according to claim 5, wherein the data compression means includes:

means for partially decoding the first data stream to expand data which has been compressed to reduce temporal redundancy and to expand data which has been compressed to reduce spatial redundancy, wherein the expansion of data values representing relatively low spatial frequency components of the image is enhanced relative to components representing relatively high spatial frequency components of the image; and means for digitally encoding the partially decoded first data stream to generate the second data stream.

7. Apparatus according to claim 6, wherein:

the first data stream includes video data which has been encoded using a discrete cosine transform to reduce the portion of the data stream used to represent spatially redundant portions of the image; and the data compression means includes means for decoding the video data in the first data stream using an inverse discrete cosine transform which emphasizes relatively low spatial frequency components of the encoded data stream relative to components which represent higher spatial frequencies.

8. Apparatus which processes signals representing video image information to produce a signal to be recorded on a tape by a digital video tape recorder (VTR), whereby the image may be displayed from the recorded signal when the VTR is operating in a trick-play mode, said apparatus comprising:

means for providing a first data stream representing a relatively high resolution video image;

filtering means for processing the first data stream to attenuate components of the first data stream, which represent parts of the high resolution video image having relatively high spatial frequencies, relative to other components of the first data stream, which represent parts of the high resolution video image having relatively low spatial frequency components, to produce a second data stream representing a relatively low resolution version of the high resolution video image, wherein the first data stream is independent of the second data stream for reproducing the image;

first data compression means, including motion compensated encoding means, for processing the first data stream to generate a compressed first data stream representing the high resolution video image;

second data compression means for processing the second data stream using only intraframe encoding techniques to generate a compressed second data stream representing the relatively low resolution video image;

means for segmenting the compressed first data stream to produce a first set of data segments representing the high resolution image;

means for segmenting the compressed second data stream to produce a second set of data segments representing the relatively low resolution image; and means for interleaving respective data segments in the first and second sets to generate the signal to be recorded by the VTR, whereby the recorded low resolution data segments are displayed in trick-play mode.

* * * * *